UNITED STATES PATENT OFFICE.

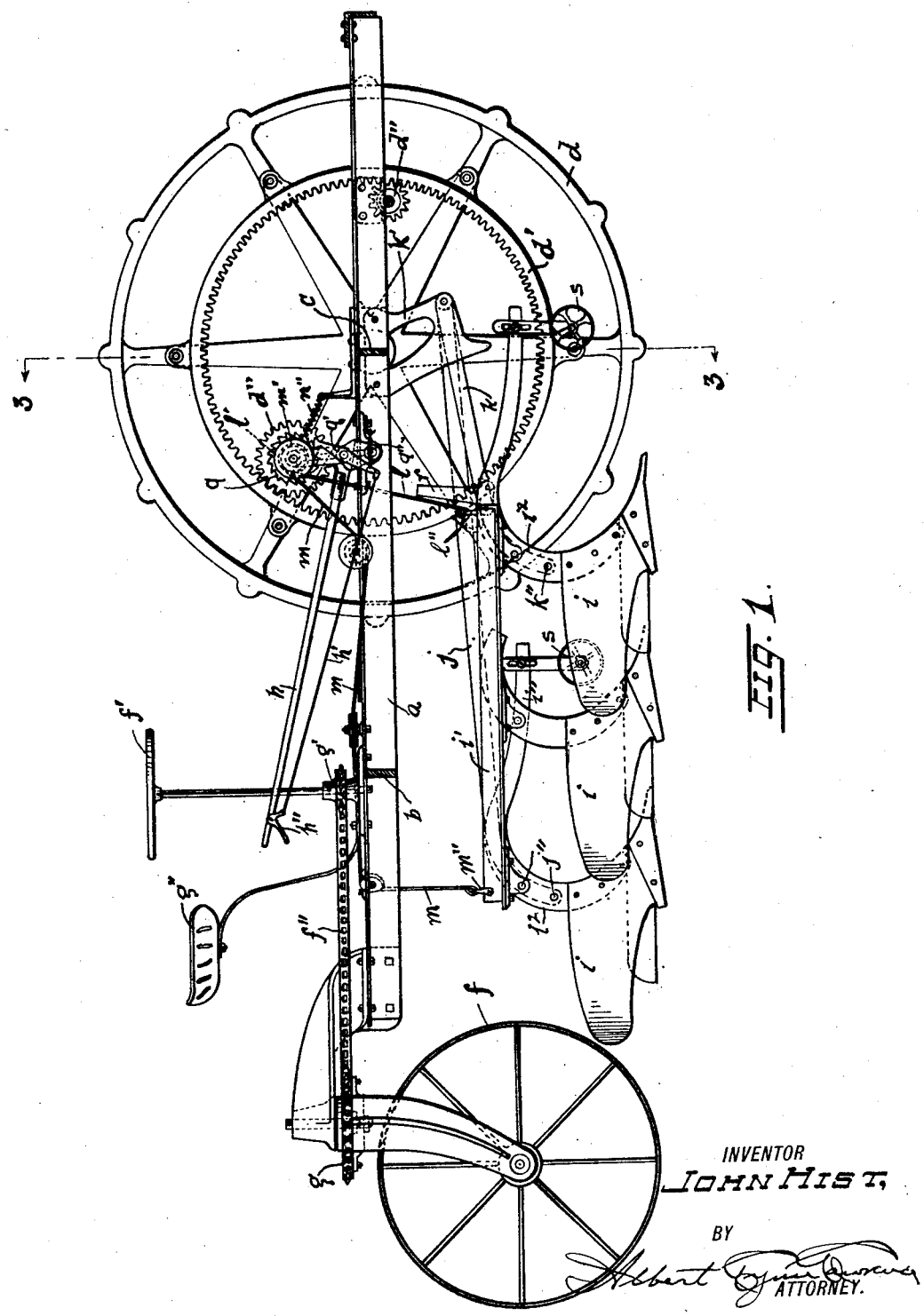

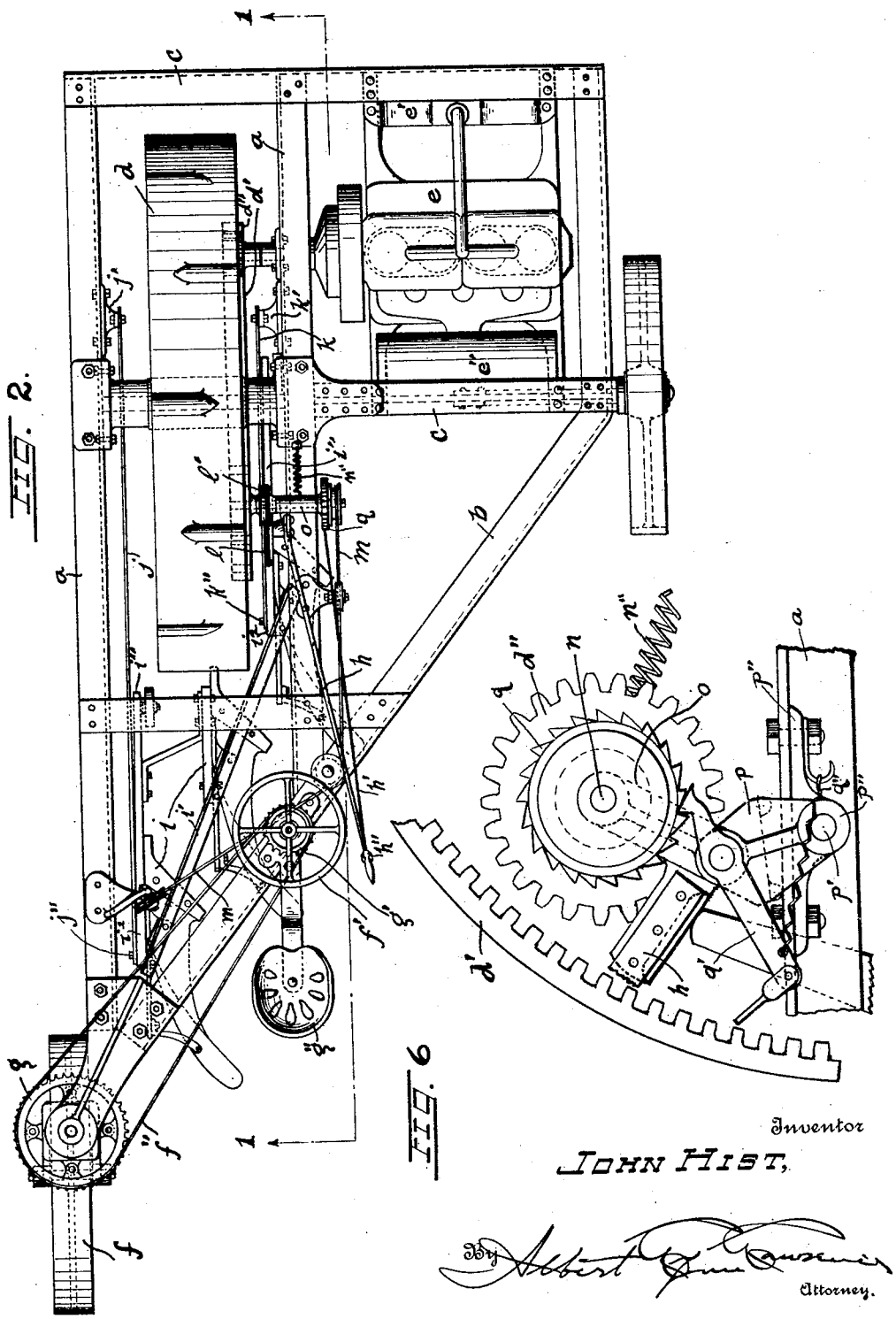

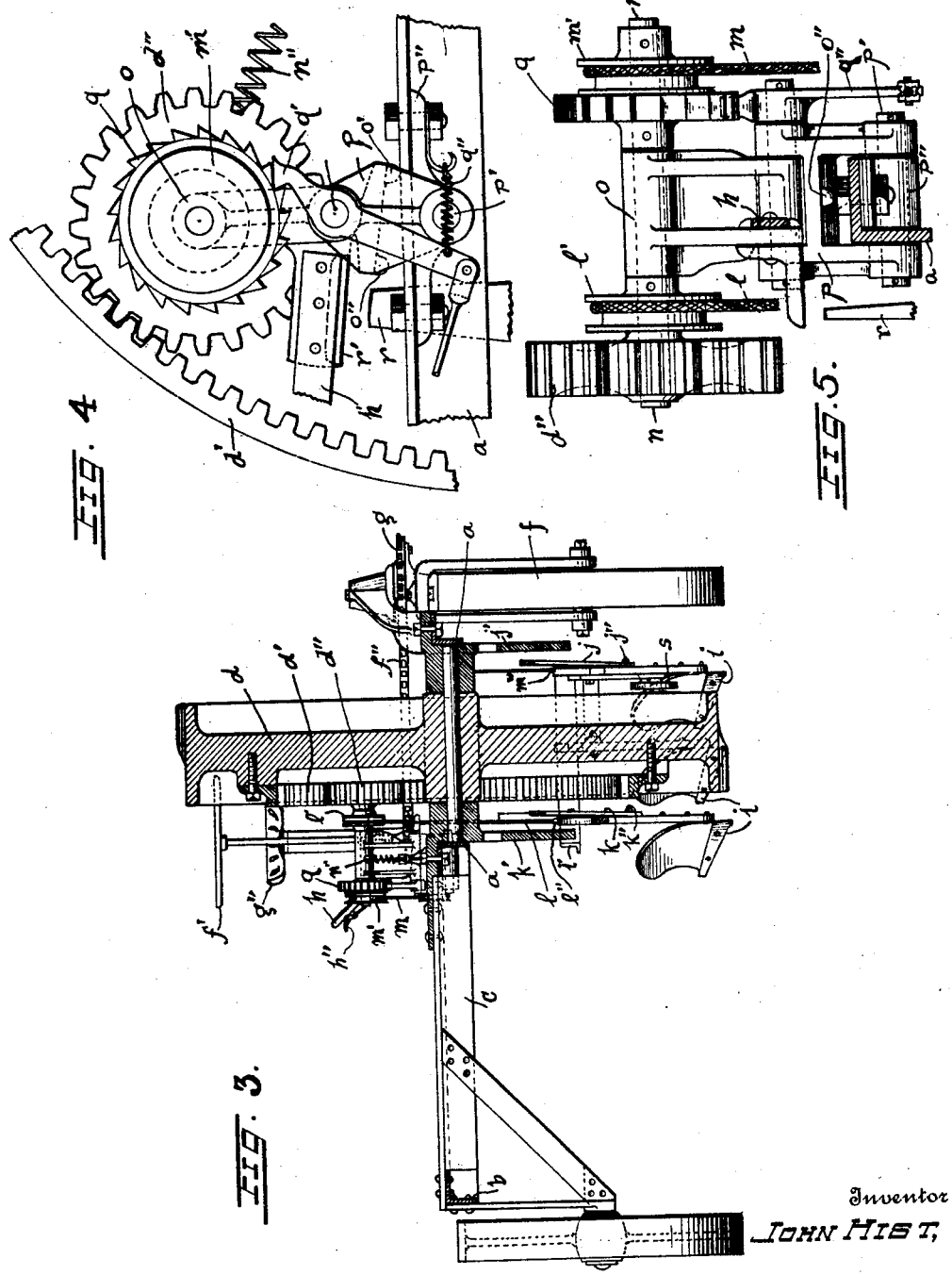

JOHN HIST, OF CLEVELAND, OHIO.

TRACTOR-PLOW.

1,399,301.　　　　Specification of Letters Patent.　　Patented Dec. 6, 1921.

Application filed June 21, 1917. Serial No. 176,132.

*To all whom it may concern:*

Be it known that JOHN HIST, a citizen of the United States, residing at Cleveland, in the county of Cuyahoga and State of Ohio, has invented certain new and useful Improvements in Tractor-Plows, of which the following is a specification.

My invention relates to improvements in tractor plows, and has for its object the provision of means in a plow of this class which will enable the gang plow to be lifted quickly from the furrows and locked in its elevated position automatically. In addition, my invention contemplates the disposition of the gang plow with relation to the tractor wheel and frame so that it will be most efficiently operated and positioned, to the end that the tractor wheel and steering wheel will at all times travel upon unplowed ground even at the finish of the dead furrow. Other advantages of secondary nature will appear from a consideration of the accompanying specifications and drawings.

I may briefly describe the apparatus of my invention as comprising a suitable tractor motor associated preferably with a single tractor wheel, mounted within a main frame wherein the gang plow is provided with floating support and draft connections permitting it to reach the desired depth irrespective, in large degree, of the surface contour of the ground. Associated with the tractor wheel is a driving mechanism for the drums which carry the lifting cables for the gang plow, so that these may be automatically lifted and thereafter locked in elevated position through the agency of the motor. Further details may best be explained in connection with the accompanying drawings, wherein Figure 1 is a view of the tractor plow in side elevation. Fig. 2 is a plan view of said plow. Fig. 3 is a transverse sectional view of the mechanism on line 3—3 of Fig. 1. Fig. 4 is an enlarged fragmentary view in side elevation illustrating the driving mechanism for lifting the gang plow. Fig. 5 is a second fragmentary view of the same device as viewed from the rear. Fig. 6 is a view of the parts shown in Fig. 4 as they appear with the plow supported in its elevated position.

Throughout the several figures of the drawings I have employed the same character of reference to indicate similar parts. Referring first to Fig. 2, the relation of the several members of my improved tractor plow may be more readily grasped. Therein, the main frame $a, a$ is braced by the diagonal frame $b$, all being connected by the cross frames $c, c$; these frames are formed of angle iron suitably bolted together. The tractor wheel $d$ is mounted intermediately of the main frame $a, a$, while the tractor motor $e$ is mounted at the side thereof between the frames $c, c$. Merely the casing thereof, the radiator $e'$ and the supply tank $e''$, are shown, as these features form no part of my invention, and any suitable motor device may be employed. The tractor wheel is provided with an internal gear $d'$, and the driving gear wheel $d''$ is mounted upon the shaft of motor $e$, for propelling the tractor in the well known manner. Details of the motor mechanism for starting, controlling and throwing in the power are omitted, since these are well known in the art and their explanation is deemed unnecessary. At the extreme left and rear of the main frame $a$ there is provided a steering wheel $f$, which is controlled by the hand wheel $f'$ and a chain $f''$, taking over the connected sprocket wheels $g, g'$. The seat $g''$ for the operative is positioned conveniently for use of the hand wheel $f'$ and of the lever $h$ which controls the elevating mechanism for the gang plow.

In the structure shown, the gang plow comprises three separate steel-beam plows $i, i, i$, which are supported in a unitary frame $i'$, $i''$. This frame is connected front and back respectively, by the links $j, k$, both of which are pivoted to the main frame slightly forward of the axle of the tractor wheel upon brackets $j', k'$; these links being rearwardly pivoted to the plow beams $i^2$, at $j'', k''$. The gang plow is provided with elevating cables $l, m$, the former being carried from the drum $l'$ and connected at $l''$, while the latter runs from the drum $m'$ and over a series of intermediate pulley wheels for connection at $m''$, as best shown in Figs. 2 and 5. These drums $l', m'$ are mounted upon a common short shaft $n$ terminating in a gear wheel $d$ which is adapted normally to be maintained out of mesh with the internal gear $d'$, by means of a heavy spring $n''$. The shaft $n$ is carried upon a knee-joint support comprising the pivoted castings $o, p$; the latter being pivoted at $p'$ within its bracket $p''$ upon the main frame $a$. The casting $o$, as best shown in Figs. 4 and 5, carries the lever $h$, and is pivoted at the upper end of the U-shaped casting p. The latter is provided with internal feet or studs o′ o″, which are adapted alternatively to find a suppporting bearing upon the upper face of frame a. A ratchet wheel q is engaged by its pawl q′ under the influence of spring q″, which is connected by rod h′ with the trip h″ near the end of lever h. The ratchet and pawl are adapted to maintain the gang plow in its position of elevation with the cables l, m wound upon their respective drums.

The mechanism is shown in the several figures of the drawings, however, with the exception of Fig. 6, in the relation wherein the lever h has been forced down by the operative in order to mesh the gear n′ with its co-acting gear d′ at the moment prior to elevating the gang plow; the operation of such mechanism being readily understood from the foregoing description of the several members, which may now be explained. Lever h forces the knee-joint toward the right with the right hand foot or stud o″ in engagement with the frame, and the gear wheel d″ is momentarily rotated in clockwise direction to wind the cables l, m upon their drums. This serves immediately to elevate the gang plow, and the riser r is forced into engagement with the abutment r′ near the base of lever h, which serves to throw the knee-joint into its opposite relation with the left hand foot or stud o″ now in engagement with the frame, and the gear wheel d″ is thrown out of mesh as shown in Fig. 6. The ratchet and pawl obviously will retain the gang plow in its elevated position until the trip h′ is actuated to release the ratchet and permit the plow to drop to the ground in its operative position.

When said plow is released it will at once form furrows immediately at the rear of the tractor wheel seeking the normal depth for which the gage wheels s, s have been set in the well known manner. The links j, k, respectively connected at the front and rear of the gang plow frame, afford a floating tractive moment, as I may term it, for permitting the best and most effective operation of the plow members, which find their own bottom in a manner long demonstrated to be the best possible working condition. This tractive moment is initiated a little below and at the front of the axle of the tractor wheel, as best shown in Fig. 1; the connecting links or bars being respectively carried to the front and rear of the gang plow frame.

It will be seen upon referring to Fig. 3 that the tractor wheel is immediately in advance of the three furrows which will be formed by the gang plow, while the steering wheel is displaced toward the right, and in consequence both of these wheels will travel upon unplowed ground even when finishing at the dead furrow, while permitting the plowing to be carried close to a line fence. The position of these members, moreover, admits of attaching a drag or pulverizer at the rear of the tractor plow so that the ground may be fitted for use as rapidly as it is plowed.

Having now described the preferred embodiment of my invention, I claim as new and desire to secure by Letters Patent, together with such modifications as may be made by mere skill, the following:—

1. In a plow mechanism, the combination with a main power-imparting wheel of a gang plow connected rearwardly thereof, flexible elevating members associated with said gang plow, a gear wheel normally maintained out of mesh, an actuating gear upon the first-named wheel, a drum mechanism for controlling the flexible elevating members, and a knee-joint support for the drum and the gear wheel adapted alternatively to hold it in or out of engagement, whereby the gang plow may be lifted by the rotation of the first-named wheel, substantially as set forth.

2. In a plow mechanism, the combination with a main power-imparting wheel of a gang plow connected rearwardly thereof, flexible elevating members associated with said gang plow, a gear wheel normally maintained out of mesh, an actuating gear upon the first-named wheel, a drum mechanism for controlling the flexibile elevating members, a knee-joint support for the drum and the gear wheel adapted alternatively to hold it in and out of engagement, whereby the gang plow may be lifted by the rotation of the first-named wheel, and an actuating member upon the gang plow adapted automatically to throw the gear wheel out of mesh upon the elevation of said plow, substantially as set forth.

3. In actuating mechanism as described, the combination with a power-imparting wheel, of driving mechanism adapted to be actuated thereby for intermittent operation, a knee-joint support therefor adapted to hold the same in alternative positions operatively engaging or disengaging said driving mechanism with or from the wheel, and automatic means for effecting the disengagement under predetermined conditions of operation.

4. In actuating mechanism of the class described, the combination with a power-imparting wheel, of driving mechanism adapted to be actuated thereby for intermittent operation, an elevating drum, a member controlled thereby, a knee-joint support for the drum adapted operatively to connect and disconnect the driving mechanism with or from the wheel, and automatic means for effecting the disconnection under predetermined conditions of operation, substantially as set forth.

5. In actuating mechanism of the class described, the combination with a power-imparting member, of an actuated member, a flexible cable connected thereto, a winding drum therefor, driving mechanism adapted operatively to connect the drum and the power-imparting member for actuation by the latter, a knee-joint support for said drum and driving mechanism adapted alternatively to hold it in or out of operative connection, and a trip associated with the actuated member adapted automatically to effect the shift of the knee-joint support, substantially as set forth.

In testimony whereof I do now affix my signature in the presence of two witnesses.

JOHN HIST.

Witnesses:
 GEO. WYMAN,
 ALBERT LYNN LAWRENCE.